United States Patent [19]

Frey

[11] 4,010,477
[45] Mar. 1, 1977

[54] HEAD ASSEMBLY FOR A JET DROP RECORDER

[75] Inventor: James A. Frey, Kettering, Ohio

[73] Assignee: The Mead Corporation, Dayton, Ohio

[22] Filed: Jan. 29, 1976

[21] Appl. No.: 653,443

[52] U.S. Cl. .................................................. 346/75
[51] Int. Cl.² ........................................ G01D 15/18
[58] Field of Search ...................................... 346/75

[56] References Cited

UNITED STATES PATENTS

| | | | |
|---|---|---|---|
| 3,618,858 | 11/1971 | Culp | 346/75 X |
| 3,717,875 | 2/1973 | Arciprete et al. | 346/75 X |
| 3,790,953 | 2/1974 | Sugiya | 346/75 |
| 3,798,656 | 3/1974 | Lowy | 346/75 X |
| 3,813,676 | 5/1974 | Wolfe | 346/75 |
| 3,836,913 | 9/1974 | Burnett et al. | 346/75 |
| 3,871,004 | 3/1975 | Rittberg | 346/75 |

OTHER PUBLICATIONS

J. W. Haskell et al., Deflecting Plate Assembly for Multiple Ink Jet Printer, IBM Technical Disclosure Bulletin, vol. 12, No. 11 (Apr., 1970), p. 2001.

Primary Examiner—George H. Miller, Jr.
Attorney, Agent, or Firm—Biebel, French & Nauman

[57] ABSTRACT

A jet drop recorder has a head assembly which generates, charges, and switches rows of jet streams arranged along angularly oriented placement lines. The spacing and angular orientation of the placement lines are selected so as to produce an effectively uniform side-by-side spacing for the drop streams arranged along the placement lines. Each placement line may include a large number of drop streams, so that there is produced a recording head capable of high resolution recording.

The drop streams are created and selectively charged by an orifice plate and a charge ring plate having orifices and charge rings in mutual registration. Below the charge ring plate there is a deflection electrode assembly comprising an insulative member provided with a series of angularly arranged teeth. Deflection electrodes are plated on opposite sides of the teeth and connected to sources of different electrical potential for generation of electrical deflection fields. Drops which are charged by application of a charging signal to their associated charge ring are deflected by the deflection field through which they are directed. The lower surfaces of the aforementioned teeth are configured to define catchers for drops directed theretoward. In one embodiment the catchers catch charge drops, and printing is effected by deposition of uncharged drops on a recording medium transported below the recording head. In an alternative embodiment the catchers catch uncharged drops, and printing is accomplished by deposition of charged drops on the recording medium.

6 Claims, 8 Drawing Figures

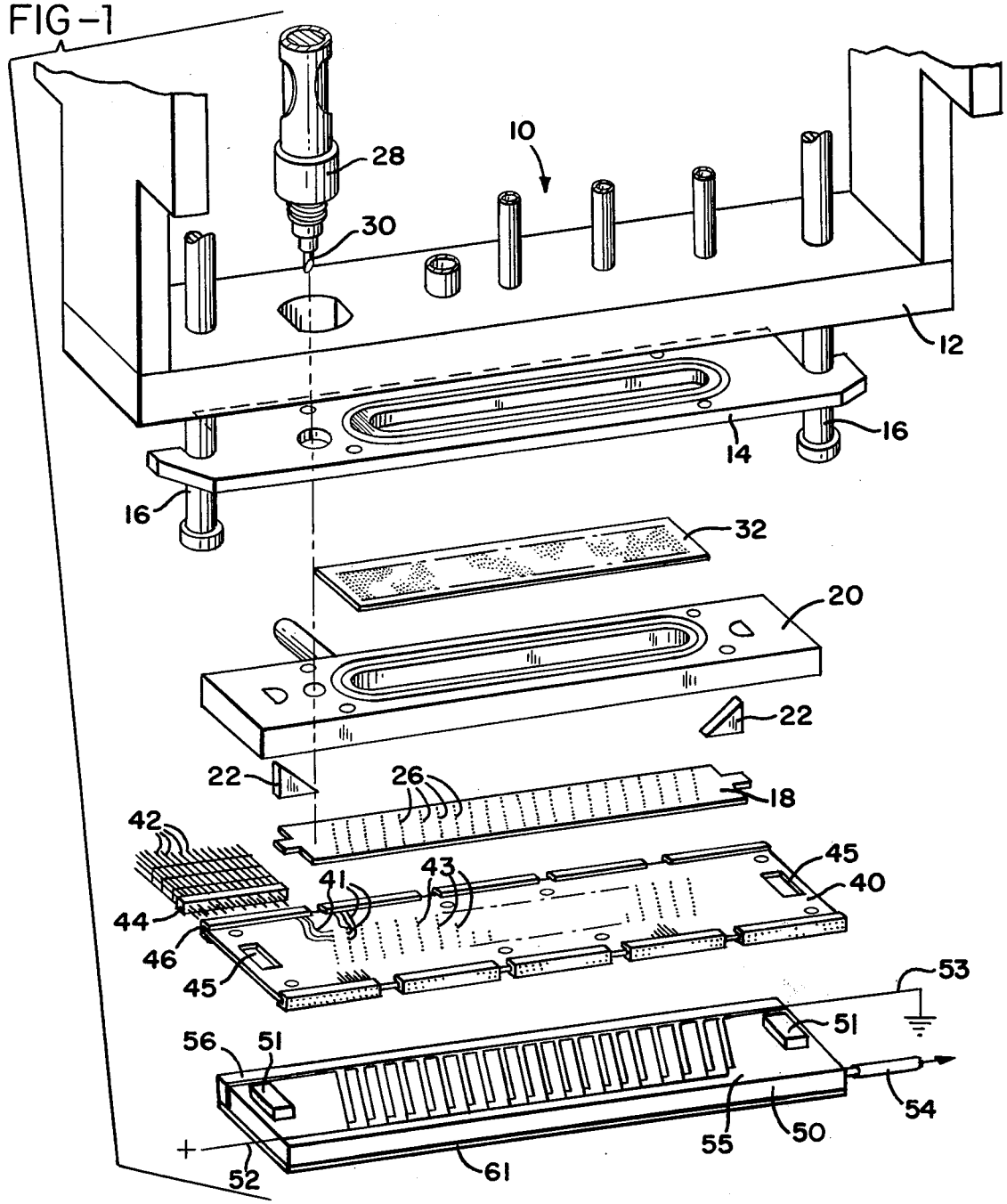

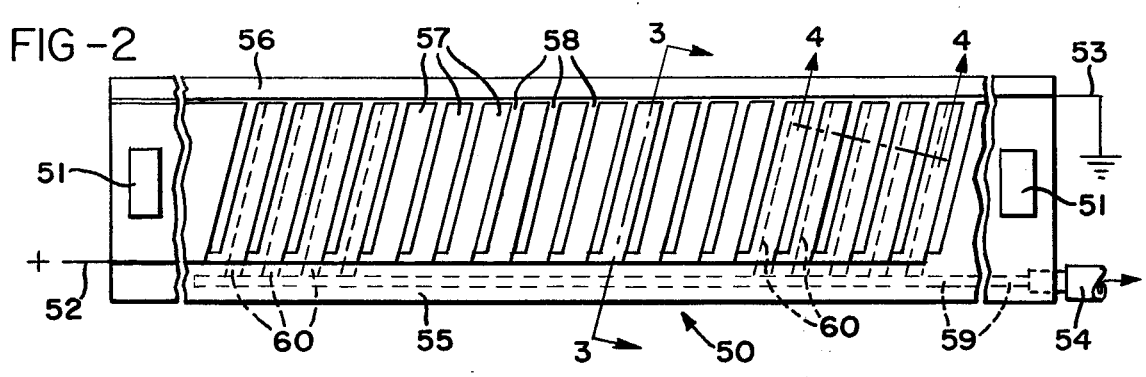
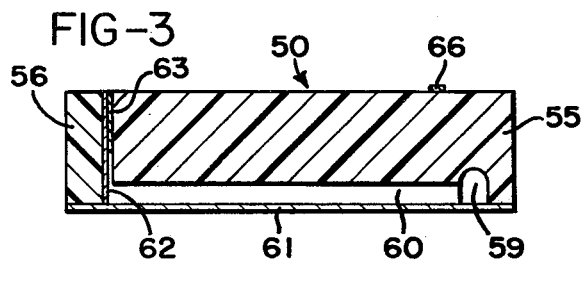
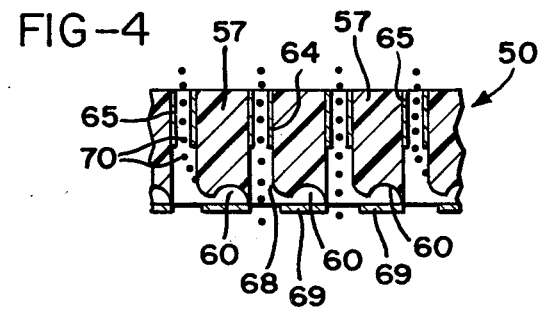
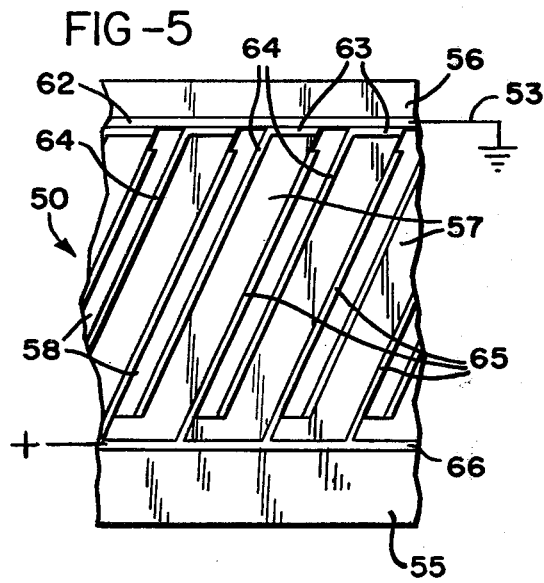
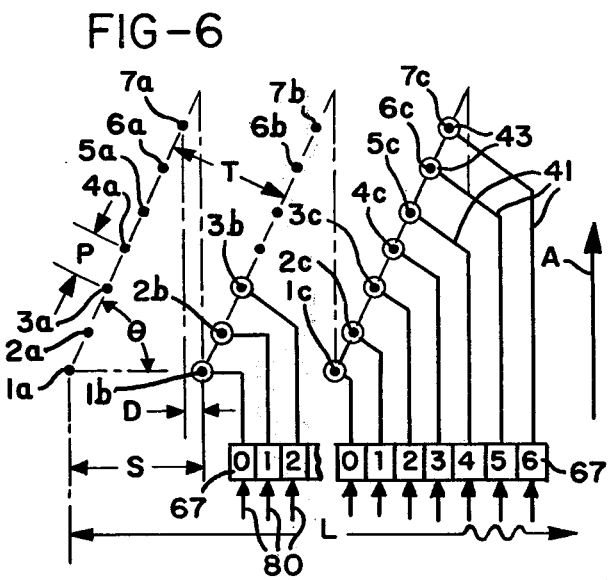
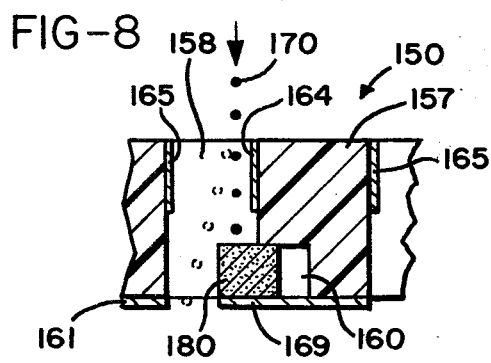
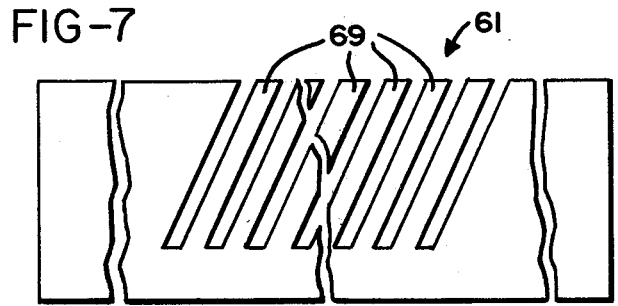

HEAD ASSEMBLY FOR A JET DROP RECORDER

BACKGROUND OF THE INVENTION

This invention relates to the field of jet drop recording and more particularly to binarily switched array type recorders of the kind generally shown in Taylor et al. U.S. Pat. No. RE 28,219. Such array recorders generate a plurality of rows of drop streams which are individually switched from "print" to "catch" trajectories. Solid coverage of a print receiving member is achieved by staggering of the rows of jets, and registration of the image is achieved by row-to-row switching delays, all as described in detail in the Taylor et al. patent.

One of the major problems in printing with recording systems as taught by Taylor et al. is in accurate spacing and alignment of the various heads or bars which generate the individual rows of drop streams. One solution to this problem is taught by Cassill U.S. Pat. No. 3,580,515, but setting up and operating a large number of bars as taught by Cassill is quite tedious and expensive. Moreover, the relatively large separation between the bars requires fairly long switching delays, which greatly complicates the data handling problem.

Another solution to the row spacing and alignment problem is taught by Mathis U.S. Pat. No. 3,701,998 wherein the rows of drop streams are generated and switched by a single head. The Mathis arrangement provides highly accurate row spacing and alignment at relatively little cost, but provision is made for only two rows of jets. Even with relatively sophisticated manufacturing techniques it is difficult to obtain close spacing between the jets within one of the rows, and hence the Mathis recorder is somewhat limited as to the resolution which may be obtained in the recorded image.

SUMMARY OF THE INVENTION

This invention provides a binarily switched array recorder which produces a large number of rows of jets all from a single recording head. Thus the invention makes it possible to achieve a high degree of printing resolution with simplicity and at a cost comparable to that afforded by the recorder disclosed in the above mentioned Mathis patent. Such a result is achieved by arranging the orifices at a uniform spacing along placement lines which extend angularly relative to the main axis of the head and which are evenly spaced along the head. For data handling purposes each jet is switched with the same time delay as corresponding jets in other placement lines, so that a line of jets comprising one jet in each placement line corresponds to a row of jets as taught by the prior art.

Drop charging for a recorder made in accordance with this invention is accomplished by use of a charge ring plate having charge rings in alignment with the array of jets but otherwise fabricated in accordance with the teachings of the prior art. Below the charge ring plate, however, is placed a deflection electrode assembly which is novel in construction. This assembly is fabricated preferably from an angularly slotted sheet of insulative material having deflection electrodes coated on the sides of the slots. The lower portion of the sheet is milled to provide ink passages, which in turn are covered by a slotted bottom plate and a conductively coated side plate. Drops which are charged by the charge rings are deflected by the above mentioned deflection electrodes for catching and removal by the ink passages. In an alternative embodiment, however, the deflected drops are directed toward a print receiving medium, and the non-deflected drops are caught and removed.

Accordingly it is an object of this invention to provide a jet drop recording head which is relatively simple and economical to fabricate and yet capable of printing images with improved resolution.

Another object of the invention is to provide a jet drop recording head which produces an array of drop streams arranged along regularly spaced and angularly oriented placement lines.

Other objects and advantages of the invention will be apparent from the following description, the accompanying drawings and the appended claims.

BRIEF DESCRIPTION OF THE DRAWINGS

FIG. 1 is an exploded view of an ink jet recording head including apparatus according to this invention.

FIG. 2 is a plan view of a deflection electrode assembly.

FIG. 3 is a view taken along lines 3—3 of FIG. 2.

FIG. 4 is a view taken along lines 4—4 of FIG. 2.

FIG. 5 is an enlarged fragmentary view of a portion of FIG. 2.

FIG. 6 is a schematic illustration of drop streams arranged in accordance with this invention.

FIG. 7 is a plan view of a bottom plate for a catcher assembly.

FIG. 8 illustrates an alternative embodiment of a catcher assembly.

DESCRIPTION OF THE PREFERRED EMBODIMENTS

A jet drop recording head in accordance with this invention comprises an assembly as illustrated in exploded form in FIG. 1. The overall head assembly as illustrated in FIG. 1 is denoted by the reference number 10 and comprises a support bar 12 and a clamp bar 14 connected thereto by means of clamp rods 16. Other elements attached to the clamp bar 14 by means of machine screws (not shown) are a filter plate 32, a fluid supply manifold 20, a charge ring plate 40, and a deflection electrode assembly 50. There is a stimulator 28 having a stimulation probe 30, which reaches downwardly for contact against an orifice plate 18.

Orifice plate 18 is welded or soldered to the lower surface of manifold 20 and is stimulated by a travelling wave stimulation technique as described in detail in Lyon et al U.S. Pat. No. 3,739,393. For facilitating such stimulation there are a pair of dampers 22, the function of which is described in the Lyon et al. patent. Orifice plate 18 is provided with a series of orifices 26, which are uniformly spaced along a series of angularly oriented placement lines, and this placement pattern forms a central feature of the invention as described in detail below.

As further illustrated in FIG. 1, charge ring plate 40 is clamped between fluid manifold 20 and deflection electrode assembly 50, this clamping being facilitated by apertures 45 in charge ring plate 40 and seats 51 on catcher assembly 50. This general type of charge ring plate clamping technique is disclosed and described in some detail in Mathis U.S. Pat. No. 3,701,998.

As also described in the Mathis patent, charge ring plate 40 may have a series of connectors 46 for connection to plugs, such as plug 44, which carries a series of wires 42. Wires 42 carry data signals which are fed via printed circuit lines 41 to a series of charge rings 43. Charge rings 43 are in alignment with orifices 26. Except for the geometrical arrangement of orifices 26 and charge rings 43, charge ring plate 40 and all elements illustrated thereabove in FIG. 1 are substantially identical to corresponding elements illustrated in the above mentioned Mathis patent. Reference may be made to that patent for a fuller description of these elements.

Deflection electrode assembly 50, which is shown in more detail in FIGS. 2 through 5, comprises a main body 55, a side plate 56, and a bottom plate 61. Connection lines 52 and 53 are provided for connection to sources of positive and ground potential respectively, and there is a vacuum line 54 for drawing off collected ink.

For a better understanding of the operation of the overall assembly, reference may be made to FIG. 6. On this figure are illustrated a series of dots which represent drop streams as viewed from above the recording head. It will be appreciated that FIG. 6 is highly schematic for understanding of the general principles involved.

As illustrated in FIG. 6 the drop streams are arranged along a series of placement lines, each making an angle $\theta$ with the main axis of the orifice plate. Any number of streams may be spaced at equal intervals along a placement line, and the placement lines are spaced so as to produce a uniform effective stream spacing in a direction parallel to the main axis of the recording head. Thus there may be seven streams 1A through 7A arranged along a first placement line, and other sets of streams such as streams 1B through 7B and 1C through 7C arranged along other placement lines parallel thereto.

As shown in FIG. 6 the actual spacing between adjacent streams within a placement line may be a distance P, and this produces an effective spacing D in a direction parallel to the main axis of the recording head. The spacing T between placement lines is adjusted such that the effective distance between the last orifice in one placement line and the first orifice in the next placement line is also equal to D. Such a spacing between placement lines results in a spacing S between corresponding streams in adjacent placement lines. Corresponding streams, such as streams 1A, 1B and 1C (together with other corresponding streams in additional placement lines not illustrated) define a row of jets corresponding to a single row of jets as taught by Taylor et al. U.S. Pat. No. Re 28,219. Accordingly an arrangement as illustrated in FIG. 6 may be switched as though it were an array of seven rows of staggered streams.

It will be appreciated that in order to produce an array of streams as illustrated in FIG. 6 it is necessary to provide an orifice plate having orifices 26 similarly arranged. In actual practice, however, an array of streams containing only seven streams per placement line would not be particularly practical. A more practical arrangement might have in the order of about 64 streams (or orifices) arranged at equally spaced intervals along a placement line making an angle $\theta$ of about 75.5° with the main axis of the recording head. The stream spacing P may be about 0.4 millimeters so that 64 such streams print a strip of width S equal to 6.5 millimeters upon a web moving in the direction illustrated by the arrow A. For such an arrangement of streams the effective placement distance D is about 51 microns. Thus an arrangement of streams so placed in 20 parallel placement lines (as illustrated by FIGS. 1 and 2) is capable of printing a strip 13 centimeters wide on a moving web with a resolution of 102 microns. Production of such an array of streams may be accomplished by employing orifices 26 having a diameter of about 32 microns, and adjusting the stimulation frequency and ink supply pressure for the density of print desired. Typically the stimulation frequency may be about 100 KHz.

Still referring to FIG. 6 it will be seen that there are a series of registers 67, each connected electrically to a charge ring 43. As taught in the Taylor et al. patent, it is necessary that an array of drop streams must be switched with row-to-row switching delays. The actual delay depends upon the speed of the moving web and the distance between the rows. As illustrated in FIG. 6 the distance between rows is equal to P sin $\theta$, which distance may be used for performing the calculations taught by Taylor et al. For the front row of streams 1A, 1B, etc. no time delay is required, and this is indicated by the number 0 in the registers connected to the charge rings for those streams. However, for the row of streams comprising the streams 2A, 2B etc. a delay of one time period must be imposed upon switching data applied to the system via an associated line 80 from a data register (not illustrated). Similarly, delays of 2, 3, and up to 6 time periods must be imposed upon data supplied to streams in rows 3 through 7. For the above described arrangement having 64 streams per placement line, the data used for switching the last stream in each placement line must be delayed by 63 time periods. For a web speed in the order of about 183 meters per minute each of the 63 time period represents a delay of about 129 microseconds.

Referring now to FIGS. 2 through 5, it will be seen that the vacuum line 54 is connected to a channel 59 milled in the lower surface of main body 55. Main body 55 is serrated by a series of slots 58 to define a series of teeth 57. Each of teeth 57 has a channel 60 milled thereunder for connection with channel 59. Channels 60 are covered by teeth 69 of bottom plate 61 to define liquid collection chambers. As best shown in FIG. 4, liquid is supplied to these chambers by drops 70, which are deflected to impact against the faces 68 of teeth 57. Vacuum line 54 causes such drops to be drawn into channels 60 and thence into channel 59 for removal from the recording head. FIG. 7 illustrates the configuration of bottom plate 61 and its teeth 69.

For the preferred embodiment of the invention printing is accomplished by allowing certain of drops 70 to fall uncharged and undeflected through the catcher assembly 50. Those drops which are not to be used for printing are charged by application of a voltage to the appropriate charge ring 43 at the correct time. Such drops are deflected by electrical fields generated between pairs of electrodes 64 and 65 which are coated on teeth 57 on opposite sides of slots 58.

As best illustrated in FIG. 5, electrodes 64 are grounded by means of electrode extensions 63 which reach around the ends of teeth 57. Electrode extensions 63 are in contact with a conductive material 62 which is coated along one face over side plate 56. A ground line 53 may be connected to conductive coating 62 by any suitable means.

An alternative embodiment of the invention may employ a deflection electrode assembly 150 as illustrated in enlarged and broken cross section in FIG. 8. The view of FIG. 8 is taken in the same direction as the view of deflection electrode assembly 50 shown in FIG. 4.

Deflection electrode assembly 150 is configured generally in a manner similar to deflection electrode assembly 50 and accordingly has a series of teeth 157 with electrodes 164 and 165 coated on opposite sides thereof. Each electrode pair 164, 165 creates an electrical field across a gap or slot 158 for deflection of any charged drops of ink passing therethrough. Any drops 170 which are uncharged cannot be deflected and therefore strike a porous member 180, which is fitted into a channel 160 on top of a tooth 169 extending angularly along a bottom plate 161.

Whereas the preferred embodiment of FIGS. 1–5 catches charged drops and prints with uncharged drops, the alternative embodiment having a deflection electrode assembly as illustrated in FIG. 8 operates in exactly the opposite manner. The "no-print" drops which strike porous members 180 are carried away by application of a vacuum to channels 160, and the "print" drops follow the trajectory suggested by the dotted circles for deposition on a moving web (not shown).

While the preferred forms of apparatus herein described constitute preferred embodiments of the invention, it is to be understood that the invention is not limited to these precise forms of apparatus, and that changes may be made therein without departing from the scope of the invention.

What is claimed is:
1. Jet drop recording apparatus comprising:
   a. a recording liquid supply manifold,
   b. an elongated orifice plate communicating with said manifold and provided with a plurality of orifice sets each comprising a plurality of uniformly sized and regularly spaced orifices arranged along a placement line extending angularly relative to the main axis of said orifice plate, said placement lines being parallel and having orifices placed therein such that members of a set of evenly spaced spacing lines parallel to said axis each pass through one orifice in each of said orifice sets,
   c. a charge plate mounted in parallel relation to said orifice plate and provided with a series of charging electrodes in alignment with said orifices,
   d. drop generating means for causing streams of recording liquid to flow continuously through said orifices and break up into drops at a regular frequency, said stream break-up into drops occurring in the region of said charging electrodes,
   e. charge control means electrically connected to said charging electrodes for charging selected ones of said drops in accordance with image information to be recorded,
   f. a deflection electrode assembly comprising angularly extending deflection electrodes arranged parallel to said placement lines and positioned for passage therebetween of the drops generated by streams issuing from said orifice sets,
   g. means for generating electrical fields between paired sets of said deflection electrodes and creating deflected and non-deflected drop trajectory characterizations corresponding respectively to charged and uncharged drop conditions, and
   h. catching means for catching all drops having one of said trajectory characterizations while permitting passage of all drops having the other of said trajectory characterizations.

2. Apparatus according to claim 1 wherein said catching means catches drops having a deflected trajectory characterization.

3. Apparatus according to claim 1 wherein said orifices are so placed along said placement lines that the entire group of orifices have an effectively uniform side-by-side spacing.

4. Apparatus according to claim 1 wherein said deflection electrode assembly comprises an insulative member provided with a series of angularly arranged teeth and said electrode pairs comprise conductive material plated on opposed sides of adjacent teeth.

5. Apparatus according to claim 4 wherein said deflection plate is positioned for causing the sides of said teeth to intercept drops falling therebetween with a deflected trajectory characterization.

6. Apparatus according to claim 5 wherein the lower surfaces of said teeth are provided with channels for carrying away intercepted collecting liquid and said channels are closed out by a bottom plate having a series of angularly extending, blade-like teeth.

* * * * *